(12) United States Patent
Chevalier et al.

(10) Patent No.: US 11,994,981 B2
(45) Date of Patent: May 28, 2024

(54) METHOD AND SYSTEM FOR TESTING AN AVIONIC COMPUTER

(71) Applicant: Airbus Operations (S.A.S.), Toulouse (FR)

(72) Inventors: Arnaud Chevalier, Toulouse (FR); Hacen Abdeslem, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 112 days.

(21) Appl. No.: 17/842,847

(22) Filed: Jun. 17, 2022

(65) Prior Publication Data
US 2023/0008659 A1 Jan. 12, 2023

(30) Foreign Application Priority Data

Jun. 22, 2021 (FR) ...................................... 2106634

(51) Int. Cl.
*G06F 9/445* (2018.01)
*G06F 11/36* (2006.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
USPC ........................................................ 717/124
See application file for complete search history.

(56) References Cited

U.S. PATENT DOCUMENTS

| 6,502,102 | B1 * | 12/2002 | Haswell | G06F 11/3664 |
| | | | | 707/999.102 |
| 8,606,538 | B2 | 12/2013 | Cahon et al. | |
| 2011/0071709 | A1 | 3/2011 | Damiani et al. | |
| 2011/0145653 | A1 * | 6/2011 | Broadfoot | G06F 11/3604 |
| | | | | 714/E11.217 |
| 2017/0242784 | A1 * | 8/2017 | Heorhiadi | G06F 11/3684 |

FOREIGN PATENT DOCUMENTS

FR 3 019 920 A1 10/2015

OTHER PUBLICATIONS

French Search Report for Application No. 2106634 dated Feb. 23, 2022.

* cited by examiner

*Primary Examiner* — Chuck O Kendall
(74) *Attorney, Agent, or Firm* — KDW Firm PLLC

(57) ABSTRACT

A method for testing an avionic computer having internal parameters of which only a subset of internal parameters is accessible to a test bench. The method includes connecting the avionic computer to the test bench, equipping the test bench with a test computer having software similar to software of the avionic computer, all of the internal parameters of which are accessible to the test bench, executing the software of the avionic computer in interaction with the test bench and executing the software of the test computer at the same time as the software of the avionic computer, and visualizing internal parameters belonging to the subset of internal parameters of the avionic computer and visualizing internal parameters of the test computer, corresponding to internal parameters of the avionic computer not belonging to the subset of internal parameters of the avionic computer, to check the conformity of operation of the software.

13 Claims, 3 Drawing Sheets

METHOD AND SYSTEM FOR TESTING AN AVIONIC COMPUTER

CROSS-REFERENCE TO RELATED APPLICATION

This application claims priority to French patent application number 2106634 filed on Jun. 22, 2021, the entire disclosure of which is incorporated by reference herein.

TECHNICAL FIELD

The disclosure herein relates to the field of testing avionic computers, in particular for updating the software of the computers.

BACKGROUND

An aircraft comprises a set of avionic computers, including flight management computers of FMS ("Flight Management System") type, flight control computers, etc. Each avionic computer comprises at least one piece of software. When designing a new aircraft, or thereafter during software updates, the avionic computer and its software have to be tested on the ground on a test bench before being tested in flight on an aircraft. The test bench is designed to simulate the real environment that the computer would have had if it were to have been installed on board an aircraft. For this purpose, the inputs and the outputs of the computer are connected to the test bench. An operator may thus monitor the output signals from the computer as a function of the input signals received by the computer. To test the software and check its conformity with specifications, in addition to monitoring the output signals, the operator also has to monitor the values of internal parameters of the computer. An avionic computer generally comprises several tens of thousands of internal parameters. Provision is made to supply, via a communication bus, a subset of the internal parameters, whose values may thus be acquired by the test bench. This subset corresponds to a limited number of internal parameters, for example 1000 internal parameters. Specifically, an avionic computer has to operate in real time with a very high level of integrity and robustness. For this purpose, these computers use processor (also called CPU) technologies that have proven themselves over many years and are therefore far slower than more modern processors. In addition, in order to guarantee operating stability of the software implemented by such computers, the consumption of CPU time by this software is limited by taking into account a margin with respect to the performance of the processors that are used. Given firstly the abovementioned performance limitations of an avionic computer and given secondly that sending internal parameters of a computer on a communication bus consumes CPU time, it is not possible to send all of the internal parameters of an avionic computer on this communication bus. Therefore, before performing a test on the software of the avionic computer, the operator has to determine which internal parameters seem to be most relevant to him for checking the conformity of the operation of the software in this test, and configure the avionic computer so as to include these internal parameters in the subset of internal parameters that the avionic computer supplies on the communication bus. However, it is difficult in practice for the operator to determine a priori all of the internal parameters of the computer that the operator will need to visualize in order to check the conformity of the operation of the software. Often, while the software test is being performed, the operator becomes aware of the need to visualize other internal parameters. The operator thus has to perform multiple successive tests while adapting, each time, the subset of internal parameters of the avionic computer that he wishes to visualize. This process generally requires 3 or 4 successive tests of the avionic computer, this being detrimental in terms of test time and usage time of the test bench.

SUMMARY

The disclosure herein aims in particular to provide a solution to this problem and relates to a method for testing an avionic computer by way of a test bench, the avionic computer being provided with software to be tested and comprising a set of internal parameters including a subset of internal parameters accessible to the test bench in order to visualize the internal parameters, internal parameters not belonging to this subset not being accessible to the test bench, the method comprising the following steps:
  connecting the avionic computer to the test bench;
  executing the software of the avionic computer in interaction with the test bench; and
  visualizing internal parameters belonging to the subset of internal parameters of the avionic computer, so as to check the conformity of the operation of the software.
The method is noteworthy in that it furthermore comprises the following steps:
  equipping the test bench with a test computer provided with software similar to the software of the avionic computer, the test computer comprising a set of internal parameters similar to the set of internal parameters of the avionic computer, all of the internal parameters of the test computer being accessible to the test bench in order to visualize the internal parameters;
  executing the software of the test computer at the same time as the software of the avionic computer; and
  visualizing internal parameters of the test computer, corresponding to internal parameters of the avionic computer not belonging to the subset of internal parameters of the avionic computer, so as to check the conformity of the operation of the software.

The test computer thus executes software similar to that executed by the avionic computer. Therefore, the internal parameters of the test computer are similar to the internal parameters of the avionic computer. Given that the software of the avionic computer and the software of the test computer are executed at the same time, the values of the internal parameters of the test computer are identical at all times to the values of the corresponding internal parameters of the avionic computer. During a test, when an operator wishes to visualize an internal parameter of the avionic computer that does not belong to the subset of internal parameters accessible to the test bench, the operator is thus able to visualize the corresponding internal parameter of the test computer. Specifically, since the test computer is not itself an avionic computer, the performance of the test computer is far better than that of an avionic computer: this test computer does not need to be certified by air certification authorities, and it may therefore use modern processor technology. In addition, there is no need to consider a CPU time usage margin in order to guarantee the operating stability of the software. Therefore, the test computer may thus send all of its internal parameters on a communication bus, such that these are accessible to the test bench for visualization. Thus, during just one and the same test, the operator is able to visualize all of the internal parameters needed to check the conformity of the software.

In an embodiment, the method furthermore comprises a step of the test bench storing internal parameters belonging to the subset of internal parameters of the avionic computer along with internal parameters of the test computer. In particular, the steps of visualizing internal parameters of the avionic computer and of the test computer then correspond to the visualization of the parameters stored beforehand by the test bench.

In an embodiment, the test computer is a computer independent of the test bench, connected to the test bench, and the method comprises a step of the test bench acquiring internal parameters of the test computer, transmitted by the test computer.

In another embodiment, the test computer corresponds to a computer of the test bench, and the method comprises a step of executing software of the test bench on this computer of the test bench.

In an embodiment, the method comprises implementing a first test as mentioned above, and then implementing a second test comprising the following steps:
- configuring the subset of internal parameters of the avionic computer accessible to the test bench as corresponding to the internal parameters of the avionic computer and to the internal parameters of the test computer that it proved necessary to visualize during the first test;
- executing the software of the avionic computer in interaction with the test bench; and
- visualizing internal parameters belonging to the subset of internal parameters of the avionic computer so as to check the conformity of the operation of the software.

The disclosure herein also relates to a system for testing an avionic computer, the system comprising a test bench, the avionic computer being provided with software to be tested and comprising a set of internal parameters including a subset of internal parameters accessible to the test bench in order to visualize the internal parameters, internal parameters not belonging to this subset not being accessible to the test bench, wherein the test bench is configured so as to visualize internal parameters belonging to the subset of internal parameters of the avionic computer so as to check the conformity of the operation of the software when the avionic computer is connected to the test bench and executes the software in interaction with the test bench.

The system is noteworthy in that:
- the test bench is equipped with a test computer provided with software similar to the software of the avionic computer, the test computer comprising a set of internal parameters similar to the set of internal parameters of the avionic computer, all of the internal parameters of the test computer being accessible to the test bench in order to visualize the internal parameters; and
- the test bench is configured so as to command the execution of the software of the test computer at the same time as the software of the avionic computer and to visualize internal parameters of the test computer, corresponding to internal parameters of the avionic computer not belonging to the subset of internal parameters of the avionic computer, so as to check the conformity of the operation of the software.

In an embodiment, the test bench is configured to store, in a memory, internal parameters belonging to the subset of internal parameters of the avionic computer along with internal parameters of the test computer. In particular, the visualization, by the test bench, of internal parameters of the avionic computer and of the test computer corresponds to the visualization of the parameters stored beforehand by the test bench.

In an embodiment, the test computer is a computer independent of the test bench, connected to the test bench, and the test bench is configured so as to acquire internal parameters of the test computer, transmitted by the test computer.

In another embodiment, the test computer corresponds to a computer of the test bench furthermore configured to execute software of the test bench.

BRIEF DESCRIPTION OF THE DRAWINGS

The disclosure herein will be better understood upon reading the following description and studying the appended figures.

DETAILED DESCRIPTION

Figure 1:
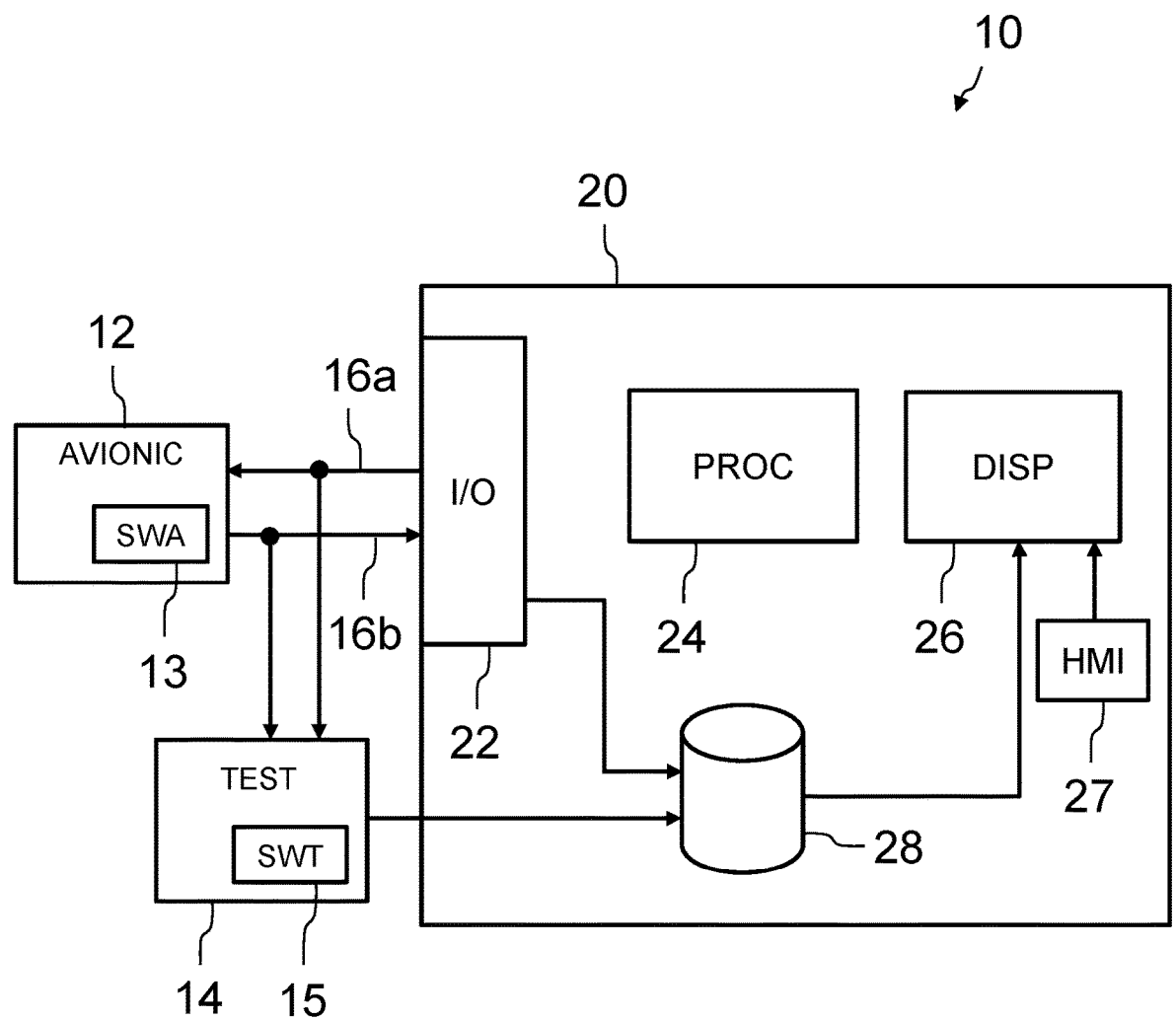
FIG. 1 schematically illustrates a system for testing an avionic computer according to a first embodiment of the disclosure herein.

The test system 10 shown in FIG. 1 comprises a test bench 20. The test bench 20 comprises an input/output interface 22 (labelled I/O in the figure), a processing unit 24 (labelled PROC in the figure), a display 26 (labelled DISP in the figure), and a memory 28. The processing unit 24 comprises for example a microprocessor or a microcontroller, a random access memory, a software storage memory, etc. The test bench 20 also comprises a human-machine interface 27 (labelled HMI in the figure) intended in particular to allow an operator to manage the display on the display 26. The test system 10 also comprises a test computer 14 comprising software 15 (labelled SWT in the figure). The test computer 14 is not subject to the certification constraints of an avionic computer: it may therefore use modern processor technologies and it is not subject to CPU time usage margin constraints. The test system 10 is used to test an avionic computer 12 that comprises software 13 (labelled SWA in the figure). The software 15 of the test computer is similar to the software 13 of the avionic computer. The avionic computer 12 is connected to the input/output interface 22 of the test bench by a set of links 16a, 16b including at least some communication buses. The test computer 14 is independent of the test bench 20. The test computer 14 is connected at input to the links of the set of links 16a, 16b. It is connected at output to the test bench 20. The avionic computer 12 comprises a set of internal parameters such as variables of the software 13, values of input parameters acquired by the avionic computer, etc. Among these internal parameters, the avionic computer comprises a subset of internal parameters accessible to the test bench in order to visualize the internal parameters belonging to this subset. Internal parameters not belonging to this subset are not accessible to the test bench. The test computer 14 also comprises a set of internal parameters, similar to the set of internal parameters of the avionic computer, since the software 13 and the software 15 are similar. The test computer 14 is configured such that all of its internal parameters are accessible to the test bench 20, via the link between the test computer and the test bench. The sending of the internal parameters from the avionic computer and from the test computer to the test bench is managed by a software layer of the computers that is independent of the abovementioned software 13 and 15.

Figure 3:
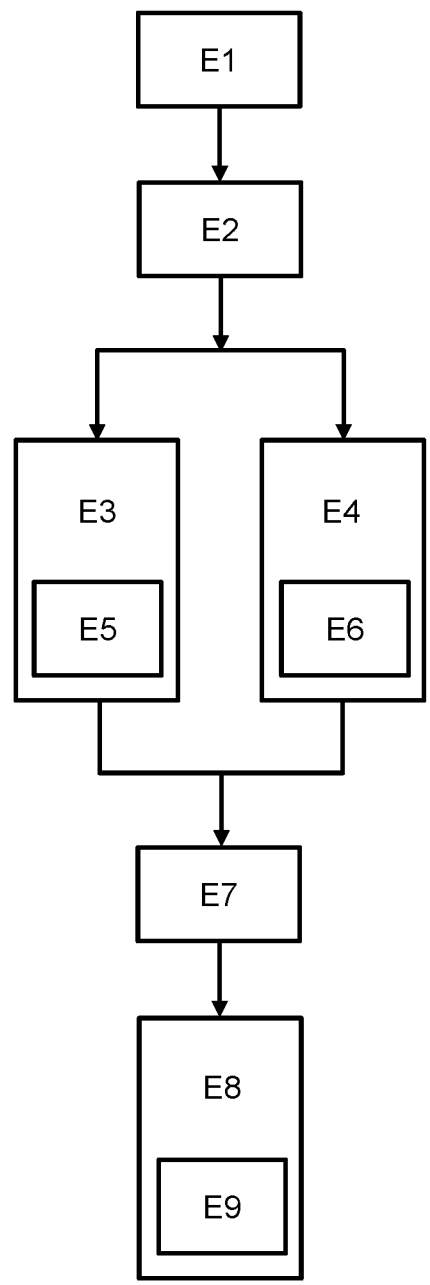
FIG. 3 illustrates a method for testing an avionic computer according to one embodiment of the disclosure herein.

During operation, as illustrated in FIG. 3, in a step E1 of a method for testing the avionic computer 12, the avionic computer is connected to the test bench 20. In a step E2, the test bench 20 is equipped with the test computer 14, that is to say that the test computer 14 is installed close to or in a bay of the test bench and connected to the test bench. These two steps E1 and E2 may be performed in any order. In a step E3, an operator commands the execution, by the avionic computer 12, of its software 13 that he wishes to test. The avionic computer 12 is then in interaction with the test bench, that is to say that it receives, via the links 16a, input signals from the test bench 10 simulating a context of the avionic computer 12 in an aircraft. Output signals from the avionic computer 12 are transmitted to the test bench 10 via the links 16b. In a step E4, the operator also commands the execution, by the test computer 14, of its software 15, at the same time as the execution of the software 13 by the avionic computer in step E3. Given that the test computer 14 is connected at input to the links of the set of links 16a, 16b, it receives the same input parameters as those received by the avionic computer 12. In a step E5, during step E3 of the avionic computer 12 executing the software 13, the operator commands the visualization of internal parameters belonging to the subset of internal parameters. For example, for this purpose, the operator uses the human-machine interface 27 of the test bench. Likewise, in a step E6, during step E4 of the test computer 14 executing the software 15, the operator commands the visualization of internal parameters of the test computer. For example, for this purpose, the operator also uses the human-machine interface 27 of the test bench. The operator is thus able to visualize internal parameters of the subset of internal parameters of the avionic computer, along with internal parameters of the test computer corresponding to internal parameters of the avionic computer not belonging to this subset of internal parameters. According to a first alternative, the avionic computer repeatedly sends, with a predetermined period, all of the internal parameters belonging to the subset of internal parameters to the test bench via a communication bus. Likewise, the test computer repeatedly sends, with a predetermined period, all of its internal parameters to the test bench via a communication bus. According to a second alternative, after the operator selects, by way of the human-machine interface 27, the internal parameters that the operator wishes to visualize on the display 26, the test bench sends requests to the avionic computer 12 and the test computer 14 so that they send the corresponding internal parameters, repeatedly with a predetermined period, to the test bench via a communication bus. The processing unit 24 of the test bench commands the display, on the display 26, of the internal parameters received from the avionic computer 12 and from the test computer 14 corresponding to the internal parameters for which the operator has commanded visualization.

Given that the software 15 of the test computer 14 is similar to the software 13 of the avionic computer 12 and that these two pieces of software 13 and 15 are executed at the same time by the avionic computer 12 and by the test computer 14, respectively, the values of the internal parameters of the test computer are identical, at all times, to the values of the corresponding internal parameters of the avionic computer. Thus, by virtue of using the test computer 14, the operator is able, during one and the same test, to visualize all of the internal parameters that the operator wishes to visualize to test the software 13, whether or not these internal parameters form part of the subset of internal parameters of the avionic computer 12 accessible to the test bench for visualization. The operator therefore does not need to perform multiple successive tests while adapting, each time, the subset of internal parameters of the avionic computer 12 accessible to the test bench for visualization. This allows a significant time saving for the testing of the software of the avionic computer.

Figure 2:
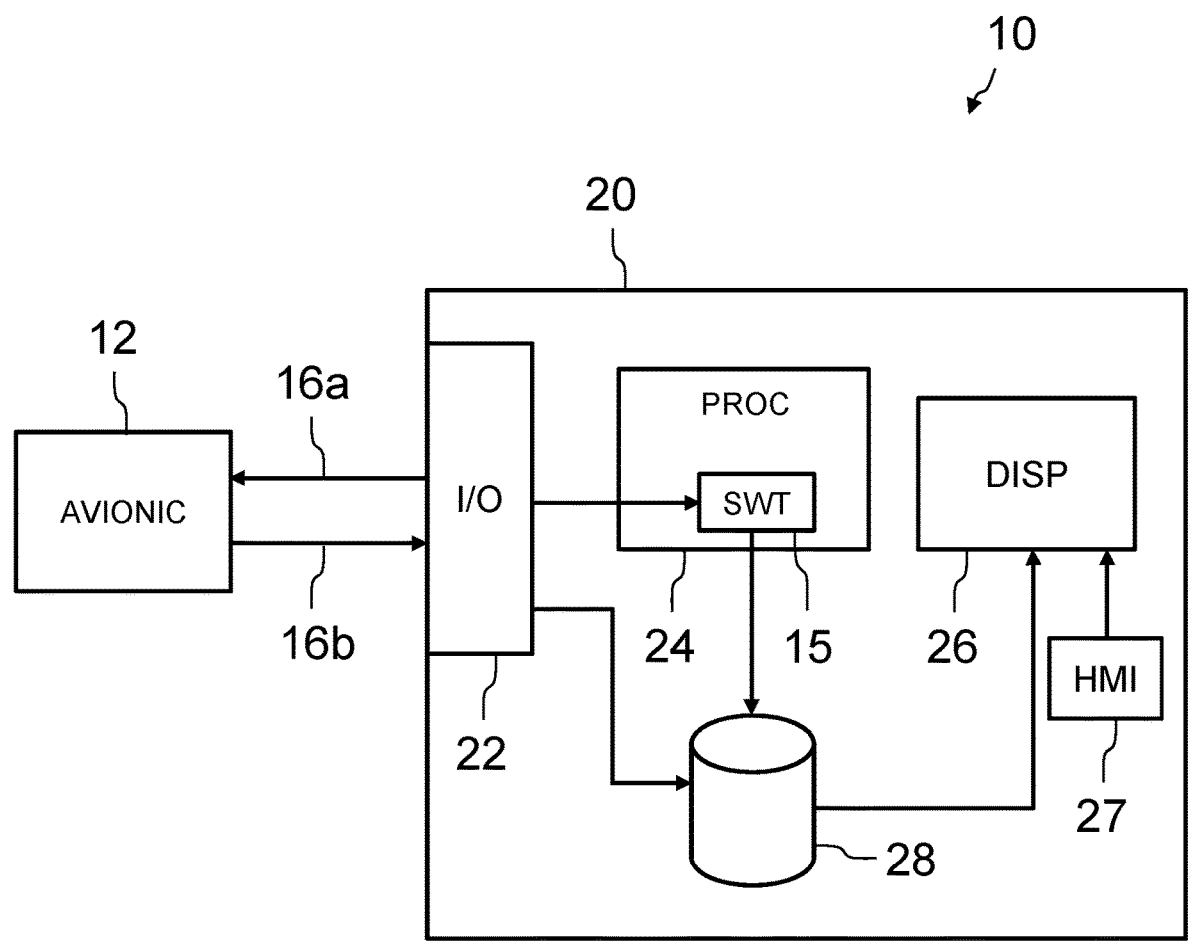
FIG. 2 schematically illustrates a system for testing an avionic computer according to a second embodiment of the disclosure herein.

In the embodiment of the disclosure herein illustrated in FIG. 2, the test computer corresponds to a computer of the test bench 20. More particularly, the software 15 of the test computer is integrated into a memory of the processing unit 24 of the test bench. Step E2 of the test method, in which the test bench 20 is equipped with the test computer 14, then corresponds to the installation of the software 15 in the memory of the processing unit 24. During operation, this software is executed by the processing unit 24. It receives the same input parameters as those received by the avionic computer 12, as illustrated by the arrow between the input/output interface 22 and the software 15. The operation is similar to that already described in the case of the embodiment illustrated in FIG. 1. In addition to executing the software 15 corresponding to the test computer, the processing unit is also used to execute at least one piece of software of the test bench 10, for example software managing the display on the display 26. This embodiment has the advantage of not requiring a test computer independent of the test bench 20 or any wiring of the links of such a computer.

Advantageously, the source code of the software 15 of the test computer 14 is identical to the source code of the software 13 of the avionic computer 12. This makes it possible to guarantee that the two pieces of software 13 and 15 are identical. This source code is for example written in C language.

Again advantageously, but not compulsorily, the test bench stores the internal parameters received from the avionic computer 12 and from the test computer 14 in a memory 28. This is illustrated in FIG. 1 by the arrows between the input/output interface 22 and the memory 28, on the one hand, and between the test computer 14 and the memory 28, on the other hand. However, in practice, the internal parameters received from the avionic computer 12 and from the test computer 14 are read by the processing unit 24, which commands storage thereof in the memory 28. This is also illustrated in FIG. 2 by the arrows between the input/output interface 22 and the memory 28, on the one hand, and between the software 15 integrated into the processing unit 24 and the memory 28, on the other hand. Like in the case of FIG. 1, the internal parameters received from the avionic computer 12 are read by the processing unit 24, which commands storage thereof in the memory 28 and which also commands the storage of the internal parameters of the test computer whose software 15 is executed by the processing unit. Storing the internal parameters in the memory 28 makes it possible to display them a posteriori, for example if the operator wishes to visualize a history of an internal parameter.

In an embodiment, an operator performs a first test on the software 13 of the avionic computer 12 by way of the test bench 20 as indicated above (steps E1 to E6 of the test method), while visualizing the internal parameters that the operator deems necessary to visualize in order to check the conformity of the operation of the software against specifications for this software. As indicated above, these internal parameters visualized in the test originate either from the avionic computer 12, if they form part of the subset of internal parameters, or from the test computer 14, if they do not form part of the subset of internal parameters. If the operation of the software 13 does not comply with the specifications, the operator modifies this software, or has it modified, in order to correct the one or more problems, and the operator then restarts the first test. If the operation of the software 13 in the first test complies with the specifications, the operator performs a second test. This second test comprises a step E7 of the test method in which the operator configures the avionic computer 12, or has it configured, so as to include, in the subset of parameters, all of the internal parameters of the avionic computer that it proved necessary to visualize during the first test. The second test then comprises a step E8 in which the operator commands the execution of the software 13 of the avionic computer 12 and a step E9 in which the operator commands the visualization of internal parameters belonging to the subset of internal parameters of the avionic computer so as to check the conformity of the operation of the software 13. Given that the subset of internal parameters has been reconfigured in step E7 as indicated above, all of the internal parameters of the avionic computer 12 that need to be visualized in order to check the conformity of the software 13 form part of the subset of internal parameters accessible to the test bench. The operator is therefore able to check the conformity of the operation of the software 13 by visualizing internal parameters originating only from the avionic computer. This makes it possible to use this second test to certify the software 13 of the avionic computer.

The subject matter disclosed herein can be implemented in or with software in combination with hardware and/or firmware. For example, the subject matter described herein can be implemented in or with software executed by a processor or processing unit. In one example implementation, the subject matter described herein can be implemented using a computer readable medium having stored thereon computer executable instructions that when executed by a processor of a computer control the computer to perform steps. Example computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for testing an avionic computer by a test bench, the method comprising:
   connecting the avionic computer to the test bench, the avionic computer comprising software to be tested and comprising a set of internal parameters including a subset of internal parameters accessible to the test bench in order to visualize the internal parameters, wherein internal parameters not belonging to the subset are not accessible to the test bench;
   executing the software of the avionic computer in interaction with the test bench; and
   visualizing internal parameters of the avionic computer belonging to the subset of internal parameters of the avionic computer to check conformity of operation of the software,
   connecting a test computer to the test bench, the test computer comprising software similar to the software of the avionic computer, the test computer comprising a set of internal parameters similar to the set of internal parameters of the avionic computer, wherein all of the internal parameters of the test computer are accessible to the test bench to visualize the internal parameters;
   executing the software of the test computer in interaction with the test bench at a same time as the software of the avionic computer;
   visualizing internal parameters of the test computer, corresponding to internal parameters of the avionic computer not belonging to the subset of internal parameters of the avionic computer to check the conformity of the operation of the software; and
   modifying the software, as needed, to correct problems associated with nonconformity of operation of the software identified when visualizing the internal parameters of the avionic computer and the internal parameters of the test computer.

2. The method according to claim 1, comprising the test bench storing internal parameters belonging to the subset of internal parameters of the avionic computer along with internal parameters of the test computer.

3. The method according to claim 2, wherein visualizing internal parameters of the avionic computer and of the test computer correspond to visualization of the parameters stored beforehand by the test bench.

4. The method according to claim 1, wherein the test computer is a computer independent of the test bench, connected to the test bench, and the method comprises the test bench acquiring internal parameters of the test computer, transmitted by the test computer.

5. The method according to claim 1, wherein the test computer corresponds to a computer of the test bench and the method comprises a step of executing software of the test bench on this computer of the test bench.

6. A method for testing an avionic computer by a test bench, comprising implementing a first test according to claim 1, and then implementing a second test comprising:
   configuring the subset of internal parameters of the avionic computer accessible to the test bench as corresponding to the internal parameters of the avionic computer and to the internal parameters of the test computer that it proved necessary to visualize during the first test;
   executing the software of the avionic computer in interaction with the test bench; and
   visualizing internal parameters belonging to the subset of internal parameters of the avionic computer to check the conformity of the operation of the software.

7. A system for testing an avionic computer, the avionic computer comprising software to be tested and comprising a set of internal parameters, the system comprising:
- a test bench configured to be connected to the avionic computer, wherein a subset of internal parameters of the avionic computer is accessible to the test bench to visualize the internal parameters, wherein internal parameters not belonging to the subset are not accessible to the test bench, and wherein the test bench is configured to visualize internal parameters belonging to the subset of internal parameters of the avionic computer to check conformity of operation of the software when the avionic computer is connected to the test bench and executes the software in interaction with the test bench, and
- a test computer connected to the test bench, the test computer comprising software similar to the software of the avionic computer, the test computer comprising a set of internal parameters similar to the set of internal parameters of the avionic computer, all of the internal parameters of the test computer being accessible to the test bench in order to visualize the internal parameters;
- wherein the test bench is configured to command execution of the software of the test computer at a same time as the software of the avionic computer and to visualize internal parameters of the test computer, corresponding to internal parameters of the avionic computer not belonging to the subset of internal parameters of the avionic computer, to check the conformity of the operation of the software.

8. The system according to claim 7, wherein the test bench is configured to store, in a memory, internal parameters belonging to the subset of internal parameters of the avionic computer along with internal parameters of the test computer.

9. The system according to claim 8, wherein the visualization, by the test bench, of internal parameters of the avionic computer and of the test computer corresponds to visualization of the parameters stored beforehand by the test bench.

10. The system according to claim 7, wherein the test computer is a computer independent of the test bench, connected to the test bench, and the test bench is configured to acquire internal parameters of the test computer, transmitted by the test computer.

11. The system according to claim 7, wherein the test computer corresponds to a computer of the test bench further configured to execute software of the test bench.

12. The method according to claim 1, wherein the avionic computer comprises a first computer that is certified by air certification authorities; and
wherein the test computer comprises a second computer that is not certified by air certification authorities.

13. The system according to claim 7, wherein the avionic computer comprises a first computer that is certified by air certification authorities; and
wherein the test computer comprises a second computer that is not certified by air certification authorities.

* * * * *